UNITED STATES PATENT OFFICE.

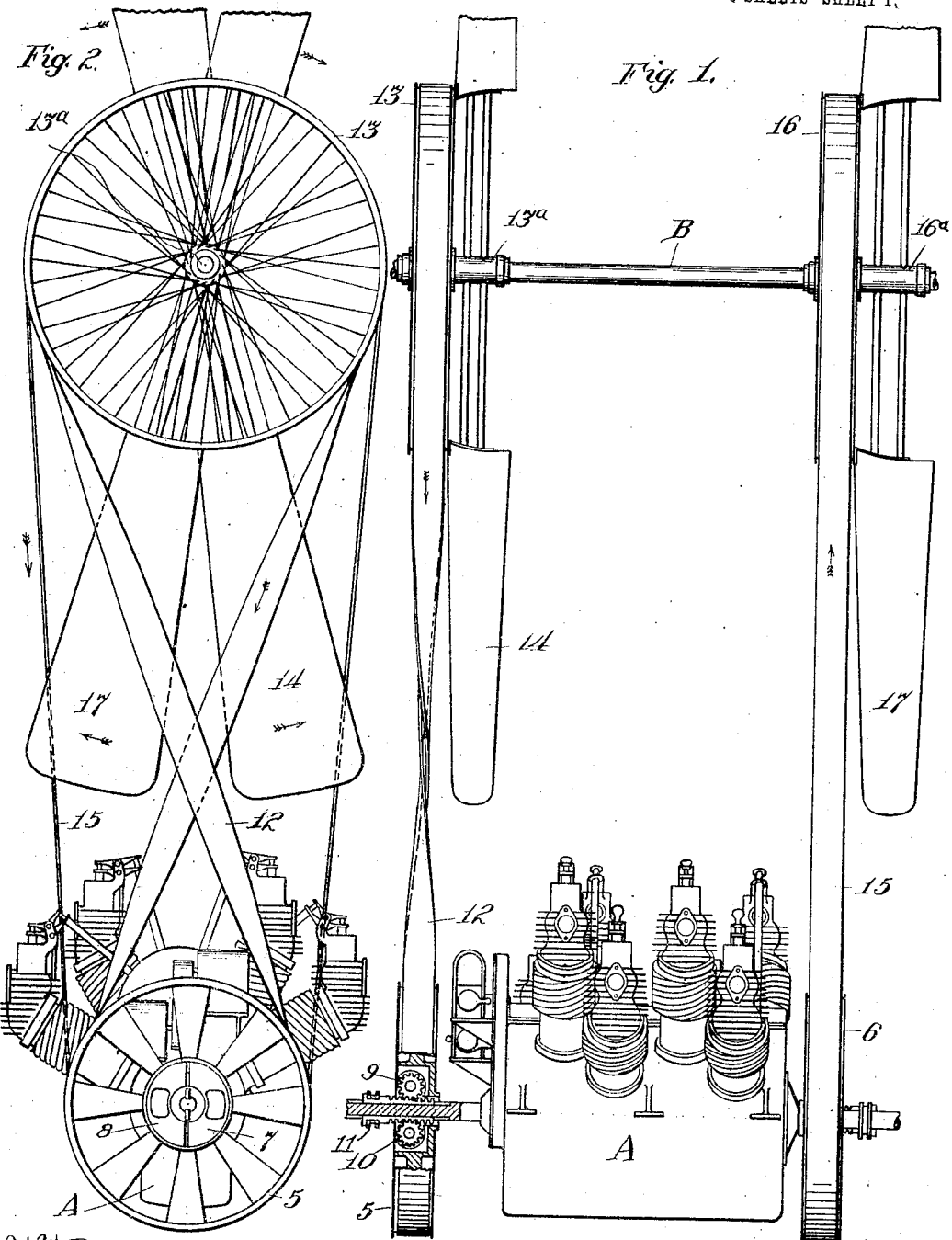

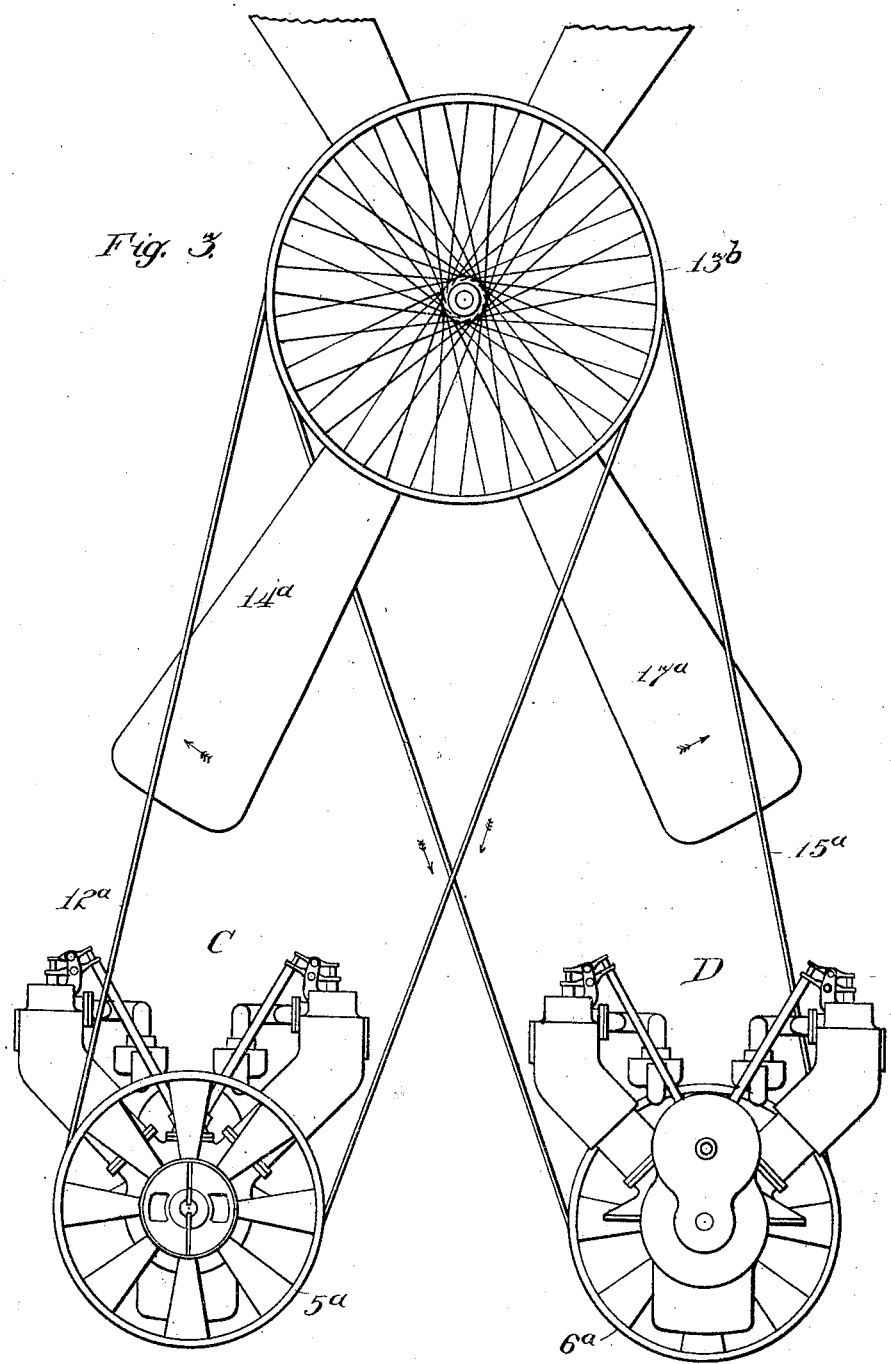

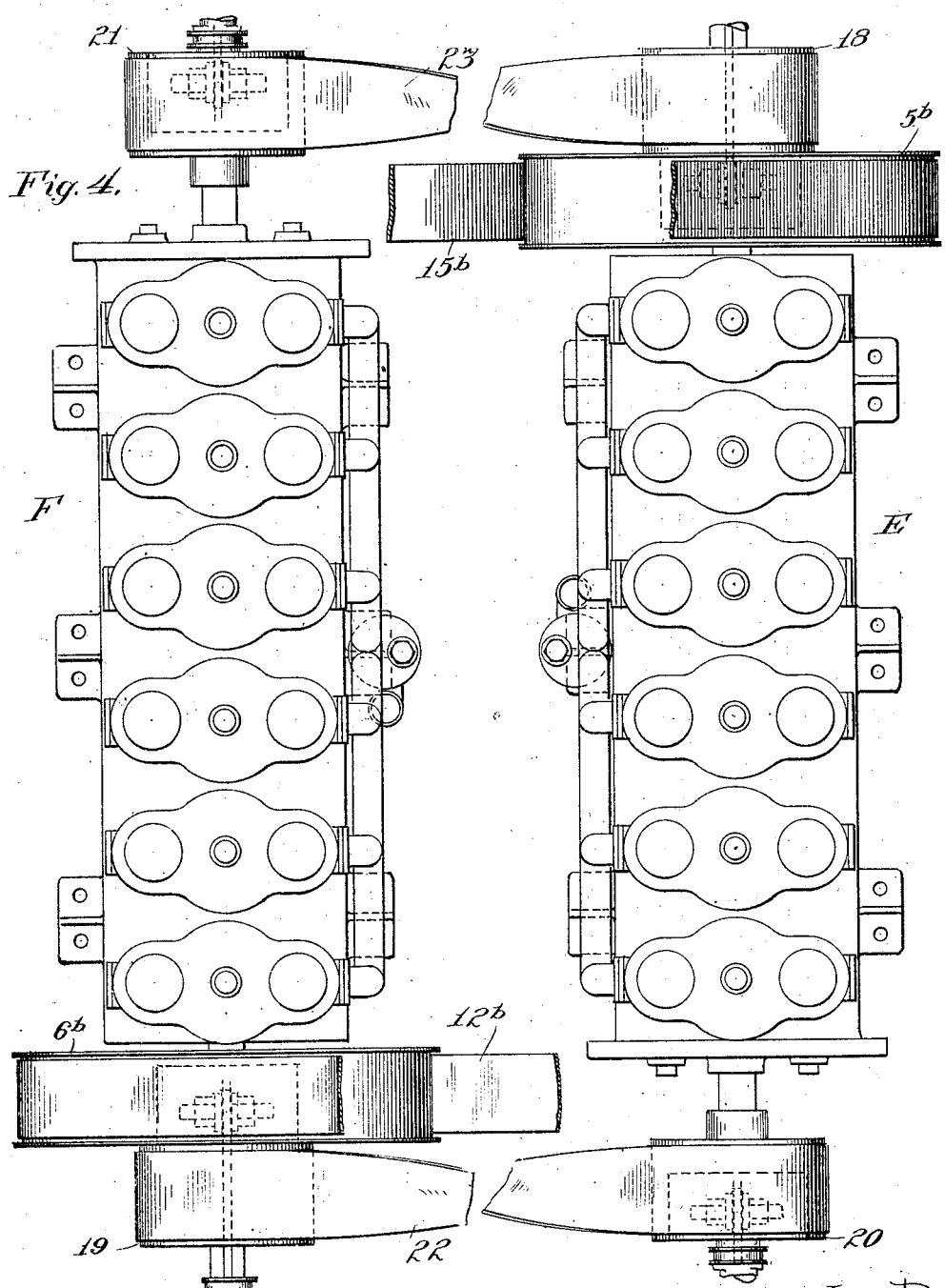

HENRY W. JACOBS, OF TOPEKA, KANSAS.

AERONAUTICAL POWER PLANT.

1,110,489.  Specification of Letters Patent.  Patented Sept. 15, 1914.

Application filed March 18, 1912. Serial No. 684,511.

*To all whom it may concern:*

Be it known that I, HENRY W. JACOBS, a citizen of the United States, and a resident of Topeka, in the county of Shawnee and State of Kansas, have invented certain new and useful Improvements in an Aeronautical Power Plant, of which the following is a description, reference being had to the accompanying drawings, which form a part of my specification.

My invention relates to an improvement in a power plant, more especially intended for aeronautical purposes, wherein two propellers are employed revolving about the same axis, with each propeller, however, being independent of the other.

Another object of my invention consists in the provision of an efficient power plant wherein the source of power may be utilized by either propeller, wholly or partially, and independently of the other.

A further object of my invention is the provision of a power plant, adapted for the purpose hereinbefore specified, wherein the center of gravity will be located below the axis of rotation of the propeller; with the power plant consisting of one or more units of power, as may be desired, so connected to the propellers, by means of suitable clutch mechanism, that the propellers and mechanism may be readily disengaged, to allow either or both propellers to revolve independently of the source of power.

Where the power plant consists of more than one power unit, the purpose of my invention is to so arrange or connect the power units, that the separate power units may independently operate a propeller, or the multiple power units may be employed to operate either one of the two propellers, as will more fully be understood from the following detailed description, wherein reference is had to the accompanying drawings, in which:—

Figure 1 is a side elevation of one form of my invention, wherein a single air cooled unit power plant is shown connected to the two propellers; a portion of the propellers being broken away and a portion of one of the driving pulleys being shown in section. Fig. 2 is an end elevation looking at the end of the power plant shown in Fig. 1 adjacent to Fig. 2, with the upper portion of the propellers shown broken away. Fig. 3 is an end elevation of a modified form of my improved power plant, wherein two water cooled power units are placed side by side; each unit being shown operatively connected with one of the propellers. Fig. 4 is a plan view of a modified form of my invention, taken at a point beneath the propellers and illustrating two power units placed side by side, consisting of two six vertical cylinder water cooled motors.

- In the exemplification of my invention, I have shown two propellers of equal diameter arranged to revolve about the same axis but adapted to revolve in opposite directions and preferably at the same speeds. The arrangement and operation of the power plant, as just stated, is my preferred form, because the opposite rotation of the propellers neutralizes any gyroscopic action due to the revolving parts of the plant.

Referring to the construction shown in Figs. 1 and 2, it will be seen that the power unit, for the purposes of illustration, comprises an eight-cylindered air cooled internal combustion motor A, the opposite ends of the power shaft whereof are provided with the two fly wheel pulleys 5 and 6. These pulleys 5 and 6 are shown as not directly connected to the power shaft, but may be secured thereto by any suitable clutch mechanism. The clutch mechanism for securing the pulleys to the power shaft, that I prefer to employ, consists of two shoes or members 7 and 8, see Fig. 2, which are operatively connected together and actuated by right and left hand screw pinions 9 and 10, see Fig. 1; and these pinions are in turn controlled through the shifting of the shifter collar 11. The clutch mechanism illustrated is similar to the clutch mechanism shown and described in United States Letters Patent #975,621, granted October 15, 1910, to applicant and Howard H. Lanning.

The means employed for driving the propellers may be of any suitable construction, but I prefer to employ belts as shown in the drawings. The fly wheel pulley 5 is connected by means of the crossed belt 12 with the pulley 13 which is secured to the hub 13$^a$ and the propeller 14, so as to compel both the pulley 13 and the propeller 14 to revolve together. The fly wheel pulley 6, mounted on the opposite end of the motor shaft, is operatively connected, by means of the straight belt 15 with the pulley 16, which latter is secured to hub 16$^a$ and to the propeller 17. As clearly shown in Fig. 1, both propellers 14 and 17 revolve about the same axis B, and a slight distance from each other.

The construction of the propellers and the manner of connecting the same to their respective pulleys may be similar to the construction shown and described in my United States Letters Patent #1,000,602, granted August 15, 1911.

In the specific construction shown in Figs. 1 and 2, both propellers 14 and 17 are shown of the same diameter, but driven in opposite directions and preferably at the same speed, with the propeller 14 in the lead and propeller 17 following. By arranging the plant in this manner, it will be seen that the crossed belt 12 precedes the forward propeller 14 where it is subjected to the least head resistance, while the belt 15, located forward of the rearward propeller 17, presents its edge to the wash of the propeller 14.

In the construction of my invention, the pitch of the propeller 17 is preferably made equal to the pitch of the propeller 14 plus the slip thereof; that is, the pitch of rearward propeller 17 is equal to that of the forward propeller 14 plus the difference in the actual velocity and the velocity that would be attained if the propeller were working in a solid medium. This arrangement and construction enables the rearward propeller to attain the same efficiency as that of the forward propeller, and when but one propeller is used, this combination gives two propellers of different pitches, thereby giving a greater range of speed for the machine driven by a power plant of this construction. With the propellers 14 and 17 revolving at the same speed when both are in use, their different directions of rotation will tend to counterbalance any centrifugal forces that may be set up by the rotary motion of the propellers, thus overcoming a serious objection heretofore encountered in aeronautics.

In Fig. 3, I show a modified form of my invention wherein two power units C and D are employed arranged side by side, with each unit driving its own propeller by means of straight belts; the fly wheel pulley ends of the units being presented in opposite directions. The fly wheel pulleys in the construction illustrated in Fig. 3 are placed on the same respective ends of the internal combustion motors; and the power units in this figure, for the sake of convenience, are shown as of the water cooled type of internal combustion motors. The motor or power unit C has its power shaft provided with a fly wheel pulley $5^a$, while the power shaft of the power unit or combustion motor D is provided with the fly wheel pulley $6^a$, the fly wheel pulley on the motor C being presented forwardly or leading, while the fly wheel pulley on the motor D is presented rearwardly or following. The fly wheel pulley $5^a$ is connected by the straight belt $12^a$ with the pulley or wheel $13^b$, which is secured to the forward propeller $14^a$, and the propeller $14^a$, in this figure, is intended to revolve clockwise, while the propeller $17^a$ revolves in the opposite direction through the action of the belt $15^a$ which is secured to the fly wheel pulley $6^a$ of the power unit or motor D; the pulley or wheel secured to propeller $17^a$ is similar in construction to $13^b$, but, of course, cannot be seen in this figure because it is located back of pulley $13^b$. When this arrangement is employed, the clutch mechanism or members may or may not be used; but, on account of the greater flexibility of the power plant, I prefer to employ them.

In Fig. 4, I illustrate another modification or combination wherein I show two power units arranged side by side in the form of two six-cylindered water cooled motors E and F; the cylinders being shown arranged vertically; and the power shafts of each motor are provided with a fly wheel pulley, to wit, pulleys $5^b$ and $6^b$. The fly wheel pulley ends of the units in this construction, as in the form shown in Fig. 3, are presented in opposite directions, so that the propellers under ordinary conditions may be revolved in opposite directions, with each motor or power unit operating a propeller. In this construction, I provide the fly wheel pulley $5^b$ with the extension pulley 18; while the pulley $6^b$ is similarly provided with the extension pulley 19. Both extension pulleys 18 and 19 are intended to be provided with clutch mechanism, preferably of the nature illustrated in Fig. 1, and more specifically described in the United States Letters Patent #975,621, heretofore referred to.

On the opposite ends of the power shafts of the power units or motors E and F, I provide clutch pulleys 20 and 21 respectively. The extension pulley 19 is connected to the clutch pulley 20 by any suitable means as for example, by the crossed belt 22, and the extension pulley 18 is connected to the clutch pulley 21 by the crossed belt 23. By reason of this construction or connection between the power shafts of the two units or motors, it is evident that the power of the two motors may be united to drive one of the propellers, or drive both of the propellers as may be desired. The belt $12^b$, which is shown taking about the fly wheel pulley $6^b$, may be connected to the pulley or wheel of the forward propeller, similar in construction to those shown in Figs. 1, 2, and 3; while the belt $15^b$, taking about the fly wheel pulley $5^b$, may connect with the rearward propeller of the power plant. It will be understood that the fly wheel pulleys $5^a$ and $6^b$ are also preferably provided in their hubs with clutch mechanism which may be similar in construction and operation to the clutch mechanism illustrated in Fig. 1. With this combination, three conditions or methods of operation may exist; for example, one power unit or motor may be employed to revolve each propeller, as illustrated in Fig. 3; or both motors may be employed to operate one propeller by simply disengaging the fly wheel pulley clutch mechanism in the fly wheel pulley connected to the idle propeller and throwing in the clutch mechanism on the opposite end of the power shaft of the motor. In this manner either propeller may be operated by both power units or motors. By disengaging or throwing out the clutch in one of the fly wheel pulleys, as for example in fly wheel pulley 5$^b$, and engaging or throwing in the clutch in the clutch pulley 21, the motor E may be left idle while the motor F will deliver power to the forward propeller through the belt 12$^b$ and also transmit power, through the belt 23, to the fly wheel pulley 5$^b$, which pulley drives the rear propeller through the medium of belt 15$^b$.

It is evident from the construction shown and described that any combination of power desired may be obtained by this arrangement; so that if one power unit or motor is disabled, the other motor can be quickly placed into an operative relation whereby both propellers may be driven by a single motor. Then, too, if one of the propellers is disabled, the two units or motors may quickly be operatively connected together, and both motors employed to drive or revolve the propeller which is still in condition to be employed. Furthermore, either motor or unit can be stopped in mid-air and be quickly started again by reason of the power which may be transmitted from one motor to the other. As the motors have provision made for relieving the compression in the cylinders, they may be easily driven by the belts, and when it is desired to volplane or glide, the motors may be shut off and quickly started again through the windmill action of the propellers.

I have shown and described several modifications or methods of operating the power plant, or operatively connecting the motors of the plant; other modifications however may be employed without departing from the spirit of my invention, and I do not wish to be understood, therefore, as limiting myself to the exact constructions shown and described; but

What I claim as my invention and wish to secure by Letters Patent, is:—

1. An aeronautical power plant, comprising a pair of propellers arranged one in advance of the other and to revolve about coincident axes, each propeller being provided with an enlarged pulley or wheel, the propellers being of equal size with the pitch of the rearward propeller greater than that of the forward propeller, power-producing means located beneath the axes of the propellers, means whereby said power producing means is operatively connected with the pulley or wheel of each propeller so that the latter may be independently and oppositely driven, and means intermediate of said power producing means and the second mentioned means whereby all the power generated may be imparted to either one of said propellers.

2. An aeronautical power plant, comprising a number of propellers arranged one in front of the other and revolving about the same axis with the pitch of one propeller greater than the pitch of the other propeller, a source of power consisting of a number of power units arranged beneath the axis, driving means intermediate of the source of power and each propeller whereby the propellers are driven independently, and means whereby the driving means connected with either propeller may be affected and the power generated by all the units imparted to a single propeller.

HENRY W. JACOBS.

Witnesses:
FRANK MITCHELL,
W. L. NELSON.